Figure 1:
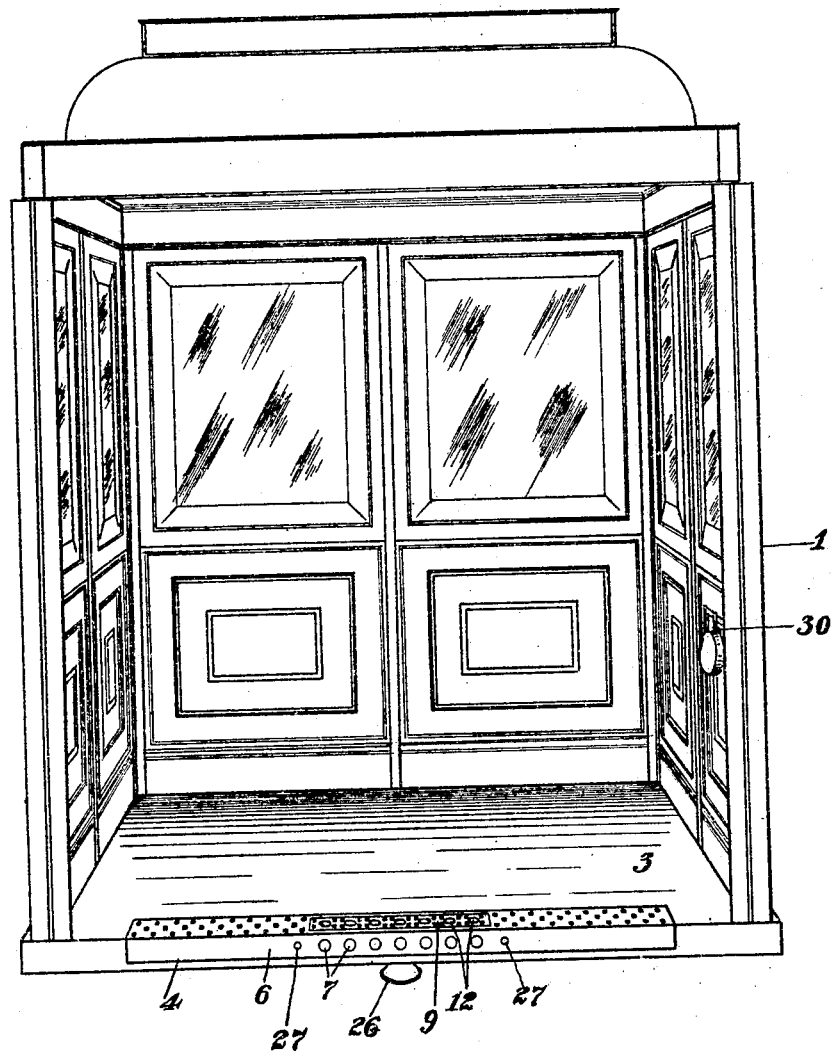

C. B. RICKETTS.
ILLUMINATED THRESHOLD.
APPLICATION FILED JUNE 25, 1909.

958,542.

Patented May 17, 1910.
6 SHEETS—SHEET 1.

C. B. RICKETTS.
ILLUMINATED THRESHOLD.
APPLICATION FILED JUNE 25, 1909.

958,542.

Patented May 17, 1910.

6 SHEETS—SHEET 2.

Witnesses:
George G. Anderson.
Gladys Walton.

Inventor:
Claude B. Ricketts,
By Hugh K. Wagner
His Attorney.

C. B. RICKETTS.
ILLUMINATED THRESHOLD.
APPLICATION FILED JUNE 25, 1909.
958,542.
Patented May 17, 1910.
6 SHEETS—SHEET 3.
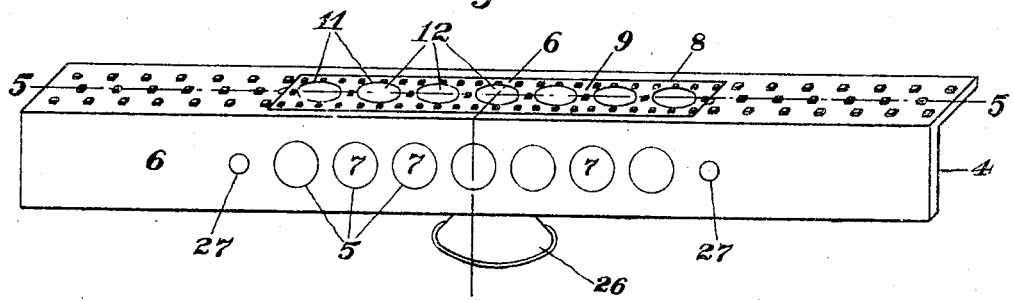
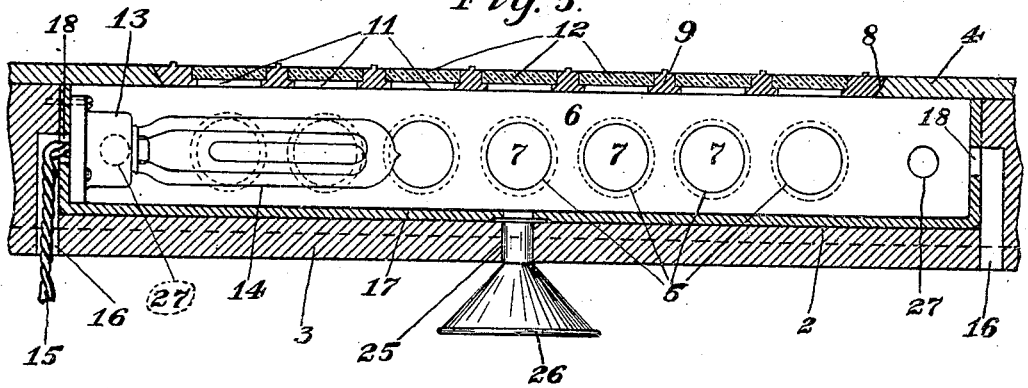
Witnesses:
George G. Anderson.
Gladys Walton.
Inventor:
Claude B. Ricketts,
By Hugh K. Wagner
His Attorney.

C. B. RICKETTS.
ILLUMINATED THRESHOLD.
APPLICATION FILED JUNE 25, 1909.
958,542.
Patented May 17, 1910.
6 SHEETS—SHEET 4.
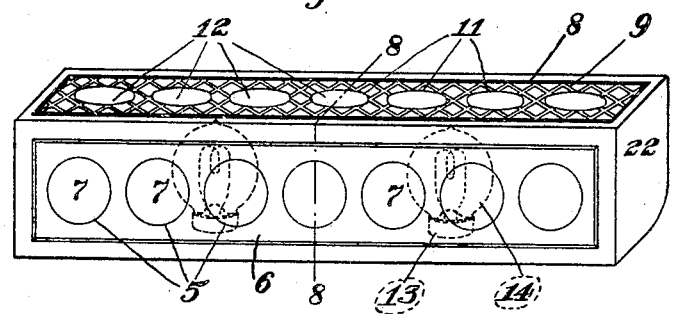
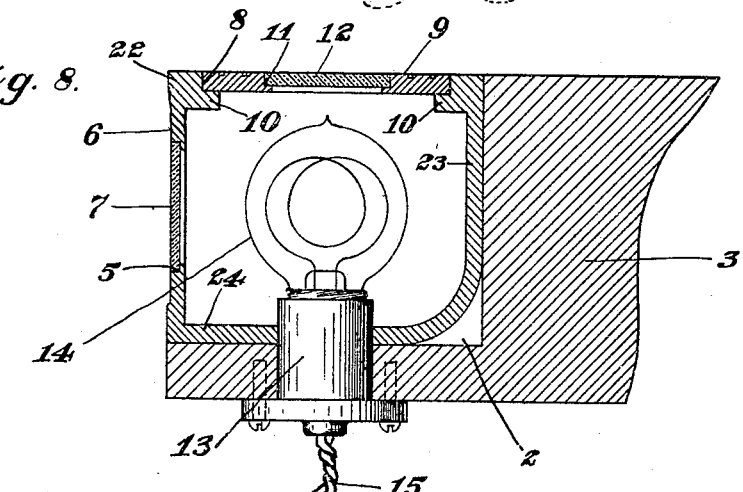
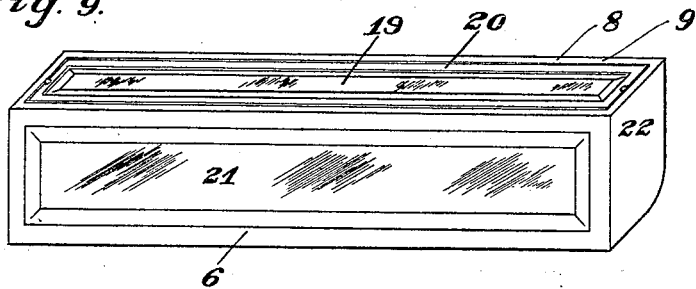
Witnesses:
George G. Anderson
Gladys Walton.
Inventor:
Claude B. Ricketts,
By Hugh K. Wagner
His Attorney.

C. B. RICKETTS.
ILLUMINATED THRESHOLD.
APPLICATION FILED JUNE 25, 1909.

958,542.

Patented May 17, 1910.
6 SHEETS—SHEET 5.

Witnesses:
George G. Anderson.
Gladys Walton.

Inventor:
Claude B. Ricketts,
By Hugh K. Wagner,
His Attorney.

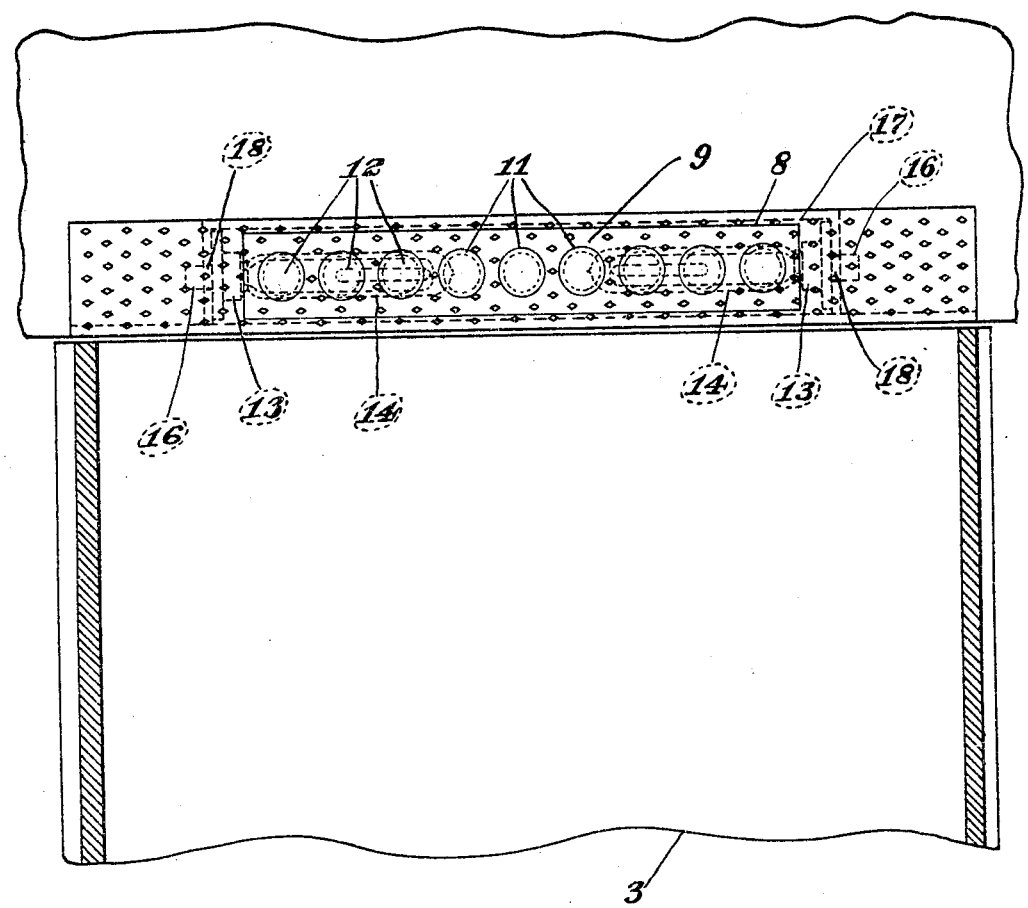

UNITED STATES PATENT OFFICE.

CLAUDE B. RICKETTS, OF ST. LOUIS, MISSOURI.

ILLUMINATED THRESHOLD.

958,542.  Specification of Letters Patent.  Patented May 17, 1910.

Application filed June 25, 1909. Serial No. 504,238.

*To all whom it may concern:*

Be it known that I, CLAUDE B. RICKETTS, a citizen of the United States, residing at the city of St. Louis, State of Missouri, have invented certain new and useful Improvements in Illuminated Thresholds, of which the following is a specification, reference being had therein to the accompanying drawings.

This invention consists in an improved threshold light, and is particularly intended for use in connection with the thresholds of elevators and subway cars and trains, and, in the night time, in connection with the entrances to cars, trains, etc.

In the operation of elevators, it is very desirable that the threshold of the elevator car should rest at the same level as the floor upon which a passenger leaving the elevator will step, as otherwise he is likely to stumble. Likewise, on entering a car the threshold of which does not lie in the same plane as the floor from which he enters the elevator car a passenger is likely to make a misstep. In ordinary practice, the skill of the operator has heretofore been relied upon to stop the car at the desired spot, but it very often happens that the elevator comes to a stop with its threshold either above or below the level of the landing floor.

The object of the present invention is to illuminate the elevator entrance in the best manner possible, so as to prevent accidents and inconvenience arising from the stoppage of the elevator with its floor either above or below the floor of the landing.

This invention is, also, applicable for similar purposes to the conditions found in running subway cars and trains, where the darkness and shadows necessarily obscure the crack or space between the step or threshold of the car and the platform, pavement, or other landing.

This invention can, also, be usefully applied to the night service of other trains, street-cars, etc., in a manner substantially the same as that hereinafter described in connection with subways.

While the preferred form of this invention contemplates the internal illumination of the threshold of an elevator or car threshold (or, in the case of a car, the illumination of a step from a point underneath or behind same and located on the car), yet, nevertheless, lights placed in that part of the landing floor immediately adjacent to the elevator entrance, or in the part of the passenger platform or landing adjacent to the car step or threshold, will be found highly advantageous as compared to the present unlighted condition. In whichever form this invention is embodied, the danger and inconvenience of stepping from a stationary body (*i. e.*, the landing floor or platform) to an irregularly-stopped movable body (*i. e.*, the elevator or car) is obviated by producing an illumination below the floor, or in the floor, of either the movable body or the stationary one. While advantage may sometimes be found in thus illuminating both bodies, yet, as a general rule, it will be found that the illumination of one of them is sufficient and that in many cases it is desirable to have a line of demarkation between the illuminated threshold of one of said bodies and the unilluminated threshold of the other.

Figure 2:
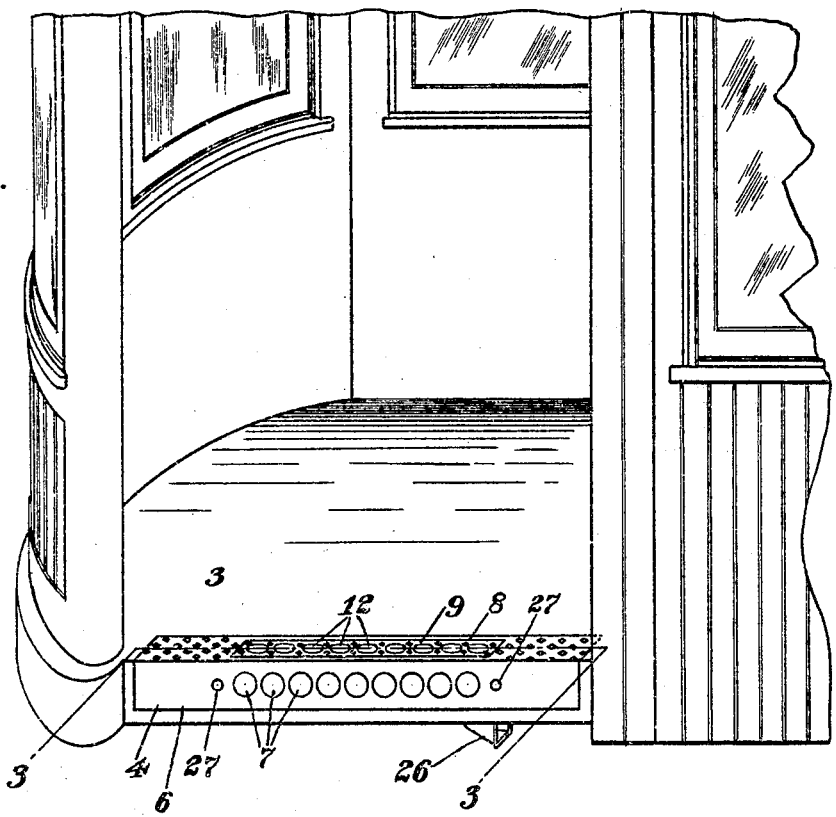
Figure 3:
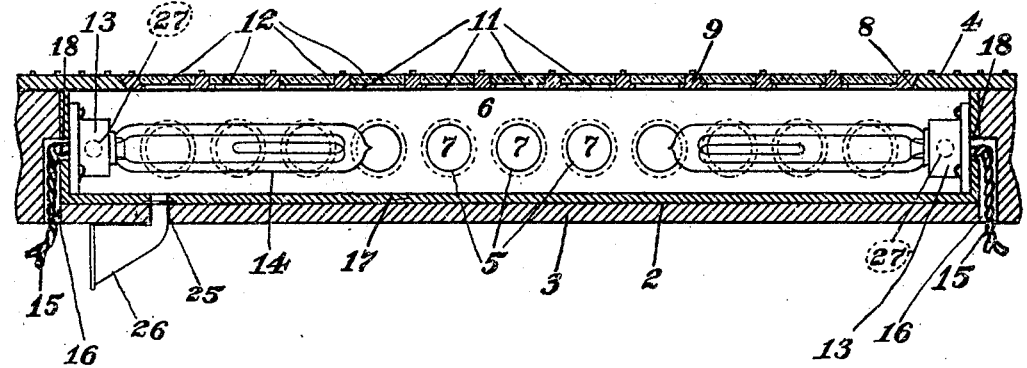
Figure 10:
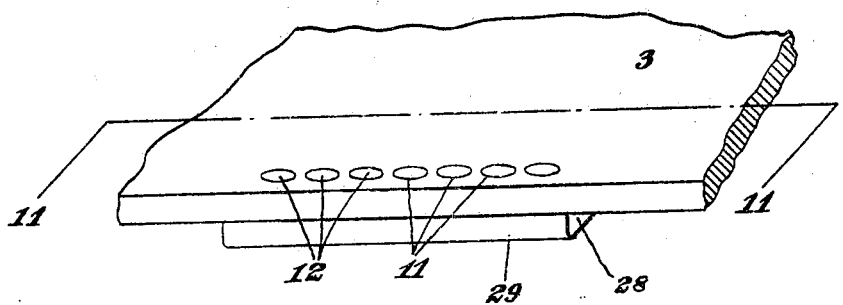
Figure 11:
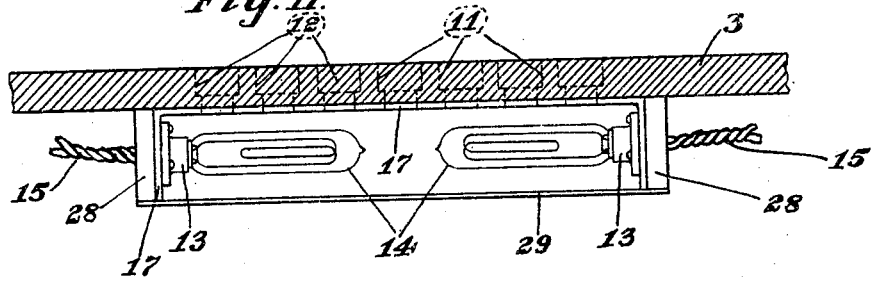
Figure 12:
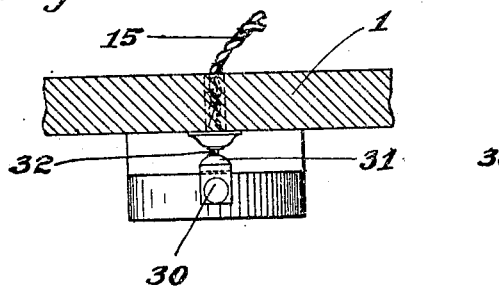
Figure 13:
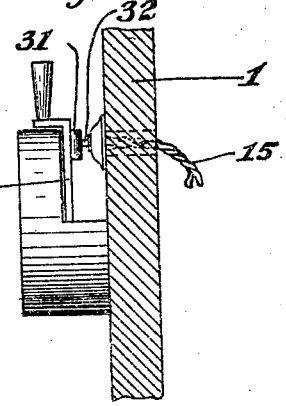

In the drawings forming part of this specification, like numbers of reference denote like parts wherever they occur, and Figure 1 is a front view of an elevator car equipped with this device; Fig. 2 is a fragmentary side elevation of the end of a car adapted to run approximately level with passenger platforms; Fig. 3 is a sectional view on the line 3—3, Fig. 2; Fig. 4 is a perspective view of the casting or casing forming the top and front of the illuminating device of Fig. 1; Fig. 5 is a sectional view on the line 5—5, Fig. 4; Fig. 6 is a sectional view on the line 6—6, Fig. 4; Fig. 7 is a perspective view of a modification; Fig. 8 is a sectional view on the line 8—8, Fig. 7; Fig. 9 is a perspective view of another modification; Fig. 10 is a perspective view of a modification; Fig. 11 is a sectional view on the line 11—11, Fig. 10; Figs. 12 and 13 illustrate an automatic device for turning on the light when the elevator or car approaches a stopping point and for extinguishing same when the car is again started; and Fig. 14 shows the threshold of the landing floor or platform illuminated instead of the elevator or car step.

The elevator 1 is provided with a recess 2 in the floor 3, said recess being preferably located at the threshold. The casing 4, which is preferably made of cast metal, closes said recess 2. In apertures 5 in the front side or riser 6 of casing 4 glass lenses 7 are placed, or other transparent or translucent material may be substituted therefor. An opening 8 in the top of said casing receives a roughened plate or tread 9, the walls of said opening being beveled so as to support said plate, as shown in Figs. 3, 5 and 6. Apertures 11 in said plate 9 receive and hold a transparent or translucent body 12. In Fig. 8, said walls are shown as formed with shoulders 10. A lamp socket 13 is attached to floor 3 at any convenient place, and may be pointed in any desired direction, and lamp 14 seats therein, said lamp being connected by wires 15 in any desired manner to the conductor cable of the elevator, said wires 15 being led out of the chamber formed by casing 4 through opening 16 in floor 3, said opening 16 also passing through a lining of asbestos 17 (or similar non-conducting material) at 18, which lines both ends and the rear of the chamber formed by casing 4. Said chamber may be provided with either one long lamp 14 or with a pair of same or more, and lamps like those depicted in Figs. 7 and 8 may be substituted for the elongated ones shown in Figs. 5 and 6.

In the preferred form of the invention, plate 9 is provided with a plurality of openings 11, which are individually closed by sidewalk lights, bull's-eyes, lenses, or the like, as illustrated in Figs. 1, 2, 3, 4, 5, and 7, but a grating may advantageously be used, and, in the modification shown in Fig. 9, a thick plate of glass 19 is set in a frame 20, which is fitted into opening 8 of the casing 4, and the riser 6 is provided with an elongated plate of glass 21 instead of a small light-vent or plurality of lenses.

While casing 4 so coöperates with recess 2 in floor 3 as to form a chamber adapted to contain illuminating means, which illuminating means consist preferably, but not necessarily, in electric lamps, yet, if desired, a boxlike casing 22 (depicted in Figs. 7, 8, and 9) may be inserted in said recess and substituted for casing 4, the chief difference between these two constructions being that a back 23 and bottom 24 are provided in the form shown in Figs. 7 and 8, but omitted in the other forms illustrated in the drawings.

As more or less heat is evolved by the illuminating means, a ventilating or cooling opening 25, or a plurality of same, may be provided in the floor 3 or wall of casing 4, or in any suitable position, to receive an influx of air, accelerated during the travel of the car. In such opening may be inserted a funnel 26, which, by reason of its flaring mouth, will receive a larger body of air than a mere hole like opening 25 and cause a rush of same into the chamber formed by casing 4. In the use of such cooling funnel in connection with a street-car, it will be preferable to turn same with its mouth toward the front of the car, in order to obtain the inrush of air that, in elevator operation, is obtained by the descent of the car when the funnel attached to the elevator is turned downward. Air exits 27 allow the escape of the air. It is, of course, optional whether the funnel in elevator construction be turned upward or downward, as the movement of the car in either direction will produce an inrush of air dependent upon the direction in which the funnel is turned, but, naturally, it is more convenient that the funnel should open downwardly.

Fig. 2 shows this threshold illuminator placed in the threshold of a car adapted to ride on the same level as a station platform, which car may be either a subway car or a car traveling in a tunnel, or it may be an ordinary street-car or railway car in which threshold illumination is needed only at night. Furthermore, in connection with the illumination of the entrance of a street-car, it should be observed that, while Fig. 2 illustrates this device located at the edge or threshold of the car platform, it could as well be attached to a car step.

In addition to the forms of this invention depicted in Figs. 1 and 7, among others, same may take the form illustrated in Figs. 10 and 11, in which braces 28, depending from floor 3, support lamps 14, while casing 29 (which may be merely of sheet tin, if desired, or any other material). apertured or not apertured as may be desired, prevents a too-glaring light directed to the front of lamps 14, the floor 3, however, being provided with apertures 11 and, if desired, transparent bodies 12, the same as in the preferred embodiment of this invention.

If, to save light current or to prevent the accumulation of heat in the lamp chamber, or for any other reason, it is desired that the lamps 14 shall not burn intermediate the various floors or stations, arrangements can be provided in connection with the elevator car, as illustrated in Figs. 12 and 13, for causing the threshold lamps to light only when the car approaches a stopping point, which is the time when such illumination is particularly needed. This can be done either automatically or in a quasi-automatic manner, by providing the controlling lever 30 with a rounded boss 31, on which button 32 is adapted to ride, said button, when pressed inwardly by boss 31, closing the circuit and causing the lamps to light. The boss 31 is normally disengaged from said button 32, but, in the case of an elevator, when the lever 30 is brought to the position adapted to stop the car, said boss 31 will be caused to contact with button 32. When the car is again started, the lever 30 is so moved that boss 31 rides out of contact with button 32, and the lamps are thus extinguished.

If the floor of an elevator equipped with this invention fails to register with the level of the landing floor, its position would be very readily observed by a person entering or leaving the car. If the elevator stops with its floor above the level of the landing floor, the rays of light which pass outwardly through the riser of the threshold would obviously illuminate the threshold of the landing in such manner as to be noticeable to a person leaving the elevator, and the illumination through the riser would be observed by a person entering the elevator. If the elevator stops with its floor below the level of the landing floor, the rays of light passing upwardly from within the tread of the threshold light would obviously illuminate the section of landing floor between the two floor levels, and would be observed by a person leaving the elevator, and the illumination through the tread would be noticeable and would disclose the tread to be lower than the landing floor, so as to be readily observable by a person entering the elevator.

It will be evident that many minor changes may be made in the form, arrrangement, and mechanical details of the several parts of the apparatus without departing from the spirit of the invention, as set forth in the following claims.

I claim:

1. A movable passenger-carrying body having a recess formed in its floor at the threshold thereof, and an illuminated casing seated in said recess for lighting up said threshold.

2. A movable passenger-carrying body having a recess formed in its floor at the threshold thereof, and an internally illuminated casing seated in said recess for lighting up said threshold.

3. The combination of a floor having a recess formed therein, said recess opening through the upper surface and through one of the side faces of said floor, and an illuminated casing seated in said recess.

4. The combination of a floor having a recess formed therein, said recess opening through the upper surface and through one of the side faces of said floor, and an illuminated casing seated in said recess and having its top face flush with said upper surface and its front face flush with said side face.

5. The combination of a movable floor having a recess formed therein, a casing fitted in said recess, and lighting means located in said casing for illuminating said floor, said casing having a light exit in its top.

6. The combination of a floor having a chamber therein, lighting means located in said chamber for illuminating said floor, a lever, and connections between the lever and the lighting means for governing the latter.

7. The combination of a movable passenger-carrying body having its floor provided with a chamber, lighting means located in said chamber for illuminating said floor, a lever, and connections between the lever and the lighting means for governing the latter.

8. A movable passenger-carrying body having a recess formed in its floor at the threshold thereof, an apertured casing fitted in said recess, and means for transmitting light through said apertures, to illuminate said threshold.

9. A threshold light comprising a casing, a lighting means arranged therewithin, and a draft funnel leading to said casing.

10. A threshold light comprising a casing including a riser composed in part of a transparent medium, a lighting means arranged within the casing, and a draft funnel leading to said casing.

11. A threshold light comprising a casing including a tread composed in part of a transparent medium, a lighting means arranged within the casing, and a draft funnel leading to said casing.

12. A threshold light comprising a casing including a riser and a tread each composed in part of a transparent medium, a lighting means arranged within the casing, and a draft funnel leading to said casing.

13. A movable passenger-carrying body having its floor formed with a recess, said recess opening through the upper surface and through one of the side faces of said floor, and an illuminated casing seated in said recess.

14. An elevator car having its floor formed with a recess, said recess opening through the upper surface and through one of the side faces of said floor, and an illuminated casing seated in said recess.

15. A vertically movable passenger carrying body having its floor formed with a recess, at its threshold, and an illuminated casing fitted in said recess for lighting up said threshold.

16. In a threshold light, the combination of a casing, a light within said casing, and an elevator car having a floor, said floor having a recess, and said casing being adapted to fit within said recess.

17. An elevator threshold consisting of a recessed car floor, a casing located in said recess, its top being flush with the main part of the floor of the car, and lighting means within said casing, said casing having a light exit in its top.

18. An elevator threshold consisting of a recessed car floor, a casing located in said recess, its top being flush with the main part of the floor of the car, and lighting means within said casing, said casing having a light exit in its front.

19. The combination of a floor, a casing forming an illuminating chamber, and a draft funnel leading thereto.

In testimony whereof I have affixed my signature in presence of two witnesses.

CLAUDE B. RICKETTS.

Witnesses:
GLADYS WALTON,
GEORGE G. ANDERSON.